United States Patent

Eckert

[11] 4,028,442
[45] June 7, 1977

[54] TOWER SUPPORT PLATE

[76] Inventor: John S. Eckert, 3000 Millboro Road, Cuyahoga Falls, Ohio 44224

[22] Filed: Sept. 12, 1975

[21] Appl. No.: 613,015

[52] U.S. Cl. .................................. 261/94; 202/158
[51] Int. Cl.² .......................................... B01F 3/04
[58] Field of Search ..................... 261/94–98, 261/113, 114 TC, DIG. 72, 110; 52/246, 635, 670–672; 202/158; 29/160, 163.5 R, 163.5 CW, 163.5 F

[56] References Cited

UNITED STATES PATENTS

| 922,305 | 5/1909 | Du Mazuel | 52/671 |
| 1,287,507 | 12/1918 | Stroebe | 52/672 |
| 1,537,588 | 5/1925 | Curtis | 52/672 |
| 2,148,698 | 2/1939 | Lachman | 52/670 X |
| 2,803,528 | 8/1957 | Erdmann | 261/98 X |
| 2,836,406 | 5/1958 | Nutter | 261/114 R |
| 3,064,954 | 11/1962 | Eckert | 261/113 X |
| 3,222,041 | 12/1965 | Eckert | 261/113 X |
| 3,281,133 | 10/1966 | Eckert | 261/110 X |
| 3,739,551 | 6/1973 | Eckert | 261/94 X |

OTHER PUBLICATIONS

U.S. Stoneware Co., Akron, Ohio, Copyright 1960, pp. 2, 14, Design Manual TA–40R.

Primary Examiner—Tim R. Miles
Assistant Examiner—Richard L. Chiesa

[57] ABSTRACT

A tower-packing support plate is made from intermittently expanded sheet metal by braking the metal in non-expanded areas to form a plate with an undulating cross-section.

Tower-packing support plates of different heights are assembled in a single tower.

Tower-packing support plates, whether assembled from sections of the same or different heights, are assembled with the meeting edges of the sections directed upwardly.

6 Claims, 9 Drawing Figures

TOWER SUPPORT PLATE

PRIOR ART

Tower-packing support plates have been made of expanded metal by merely braking the expanded sheet at desired intervals. Such support plates have high gas and liquid handling capacity, but they are not strong enough to support a required load of packing elements over a space of more than about two or three feet. Also, perforated tower-packing support plates have been assembled from sections with perpendicular, slanted and curved ends.

SUMMARY OF THE INVENTION

By passing sheet metal through an intermittent expanding tool, areas of expanded metal are formed which are separated by areas of unexpanded metal. By shearing the metal across the unexpanded areas and braking the sheet across other unexpanded areas, raw edges are eliminated and additional metal is provided at the brake lines, which strengthens the support plate section made from such an intermittently expanded sheet.

The strength of the support plate depends to some extent upon the metal from which it is made and the thickness of the sheet.

Whereas support plates made of expanded metal have been made which satisfactorily span a tower two or three feet in diameter, or a tower provided with support beams spaced two or three feet, a support plate made from an intermittently expanded sheet of the same metal and same thickness may satisfactorily span a tower which provides support only every five or six feet.

By providing I-beams or H-beams across a tower, spaced about five or six feet, or whatever is required to support a packing load, and placing support plate sections of intermittently expanded metal thereon, end-to-end, towers of any diameter can be provided with support plates according to this invention. While a support plate may comprise only a single section, it may comprise several such sections, such as three or more.

Usually the brakes will form V-bends, but this is not necessary as the brake may be more or less rounded. On the other hand, the brakes may be right angular, as discussed below and illustrated. The brakes may produce a sheet of uniform or non-uniform cross-section. All such formations are referred to herein by the term "undulating".

In the new support plate described herein, the ratio of the unexpanded areas to the expanded areas may vary, and the size of the openings in the expanded areas may vary. Generally, the ratio of the unexpanded areas to the expanded areas will be about one to three or five or more, and preferably about one to four. This depends to some extent upon the size of the expanded openings and to some extent on the thickness of the metal sheet. The areas of the openings in any sheet will usually be the same, but this may vary. Generally, the area of each opening is about ¾ to 1½ square inches, and preferably about 1 square inch. The openings will usually be diamond shaped, but this may vary.

When the support plates of undulating cross section, whether of expanded sheet metal or perforated metal, plastic, etc., such as Norton's Model 804 metal and 819FRP multibeam support plates, etc. have been assembled from sections, the mating edges of the sections have been at the bottom of the sections, namely, at the surfaces on which the support plates rest. It has not been appreciated that the weight of packing elements at the juncture of two sections assembled in this manner tends to spread the edges of the sections, particularly if the tower is located near a railroad or other installation where vibrations are generated. Such separation provides a space through which packing elements may fall. If, on the other hand, any such sections are inverted so that their edges are directed up, as disclosed herein, the weight of the packing elements on the edges of the sections tends to force them together and prevent separation.

It is not necessary that the tops of any support plate of undulating cross section be the same distances from the support for the plate, and it is not necessary that the walls all be slanted at the same angle. At times it is desirable to make the walls of different heights or to slant the walls at different angles. Thus a wall may be shortened to make a section fit into a space too narrow to hold a complete section. Also, if the sections are made from an intermittently expanded sheet, it is not necessary that the ratio of the expanded to the unexpanded areas be uniform.

One outstanding advantage inherent in the use of the support plates of the new preferred design disclosed herein is that the plates which have uniform undulating cross section nest readily in storage and in being transported, both before and after they are cut and formed to fit a tower, minimizing the cost of storage and transportation space.

The new support plate of this invention may be cut from intermittently expanded strips, preferably with minimum waste of metal or more accurately and substantial amount of waste metal if it is necessary to increase the angle of cut strips to effect a closer fit farthest from the diameter of the tower. It is not necessary that a support plate fit snugly against the tower wall. It is only necessary that the spaces provided between the wall and the ends of the support plates be so small that the tower packing elements do not pass through them, and the packing elements may be larger or smaller, as required. It is not necessary that the ends of the support plate be sheared off perpendicularly to the brakes, but they may be sheared at a smaller angle, and the angle may be progressively smaller as the sections of the support plate are positioned progressively farther from the section that spans the center of the tower. Although sections sheared in this manner may advantageously comprise several brakes, it is possible for a section to comprise just two walls with a single brake.

Because the wall of a tower curves progressively more as the distance from the section that crosses the middle of the tower increases, it may be desirable to have the sections farthest from the middle section comprise but a single brake, or perhaps two or three brakes; whereas the middle section may comprise a larger number of brakes; and the smaller sections farthest from the middle section may be not as high as the central section because they do not carry as great a weight as the more central sections. Most sections are formed with 60° peaks, and the walls meet the base at 60° to the horizontal. Sharper angles require more metal and are stronger; wider angles take less metal and are weaker. A plate is broken at the angle which produces the best overall results.

The invention is further described in connection with the accompanying drawings, in which FIG. 1 is a section through a tower with an H-beam extending from one location of the wall to another with a support plate resting on it;

Figure 1:
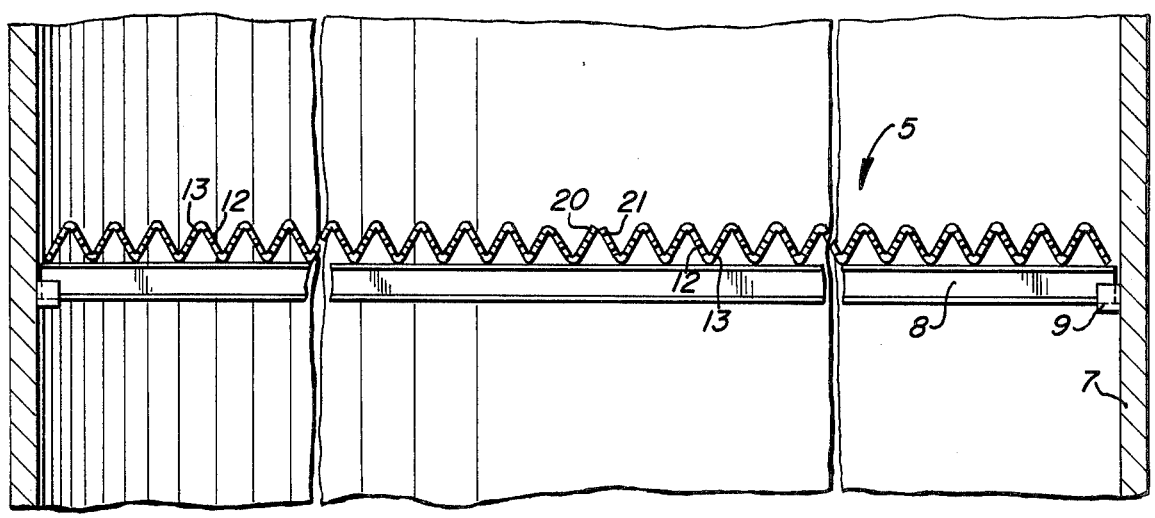
Figure 2:
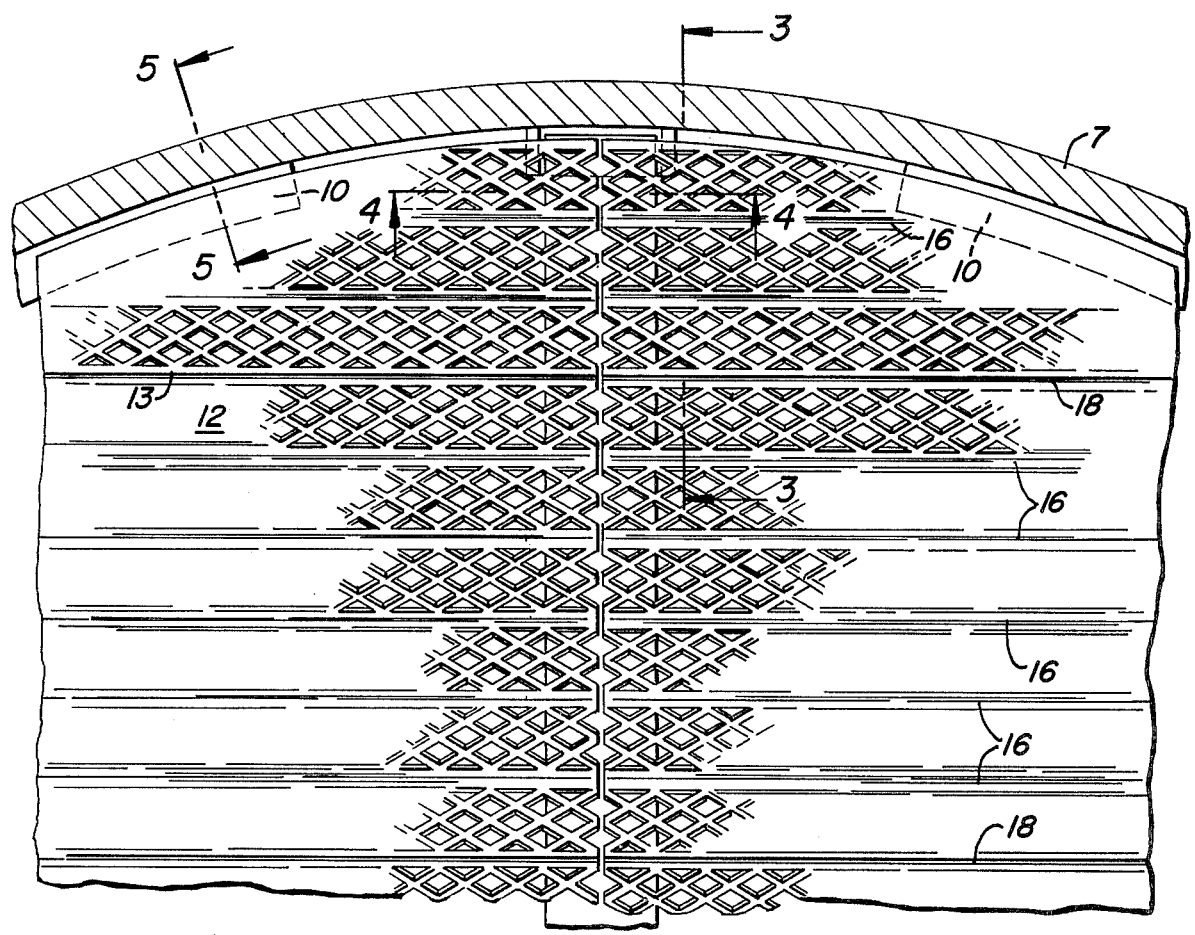
FIG. 2 is a plan view of a portion of the support plate in a tower.
Figure 3:
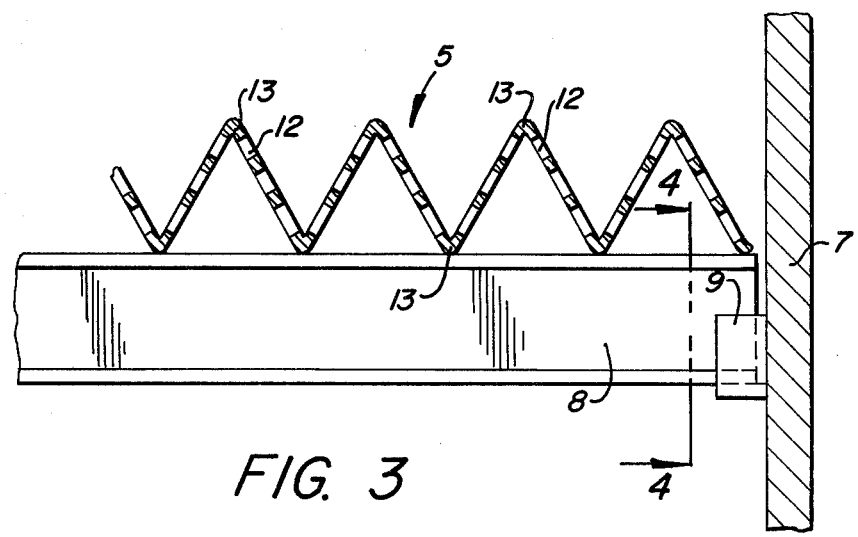
FIG. 3 is a sectional elevation on the line 3—3 of FIG. 2.
Figure 5:
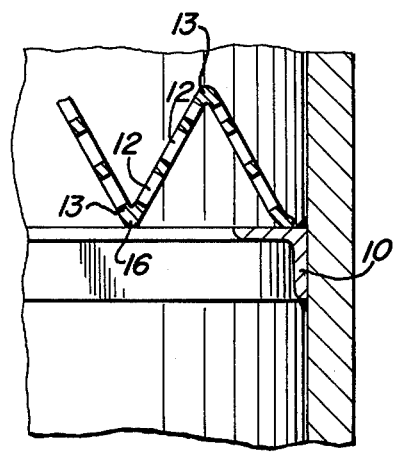
FIG. 5 is a section on the line 5—5 of FIG. 2.
Figure 4:
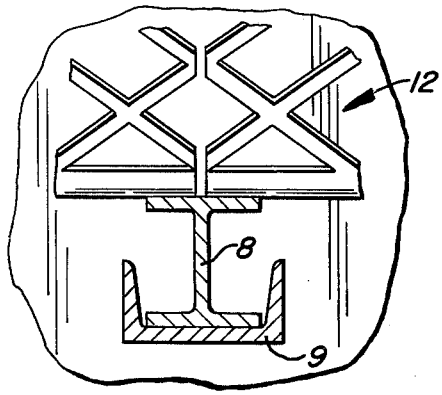
FIG. 4 is a section of the line 4—4 in FIGS. 2 and 3.
Figure 7:
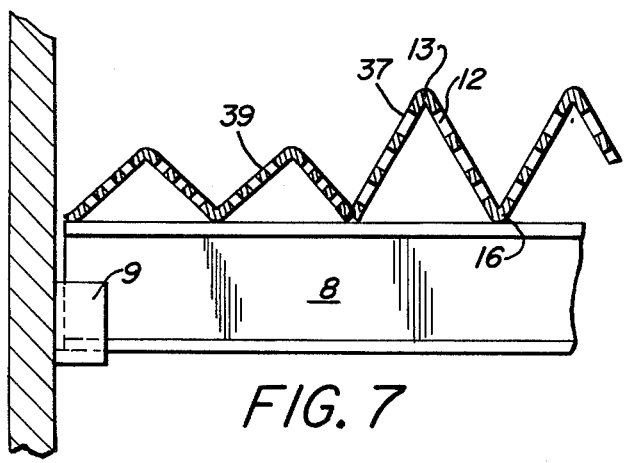
FIG. 7 is a section on the line 7—7 of FIG. 9 and shows that a support plate may be composed of sections of different heights.

FIG. 1 illustrates the support plate 5 in the tower 7 supported on the I-beam 8 which rests in flat U-clips 9 which extend from the tower wall. Support ledges 10 are located on the inside wall of the tower for the sections of the support plate to rest upon. The support plate can be supported by the tower in any suitable manner.

In the support plate, unexpanded areas 13 of the metal sheet alternate with expanded areas 12 and certain of the unexpanded areas are broken along the lines 16, and other unexpanded areas have edges which meet at 18.

The support plate may be continuous from one side of the tower to the other, or it may be made up of several sections. The support plate in FIG. 1 is shown as composed of several sections each comprising separate multiple units with their edges 20 and 21 extending upwardly and located adjacent to one another so that the weight of the packing elements on them forces their edges in close contact. The inner ends of the support plates rest on the beam 8 and the outer ends rest on ledge 10, except that there may be several parallel beams across the tower in which case both ends of the most central units will rest on separate beams.

Figure 6:
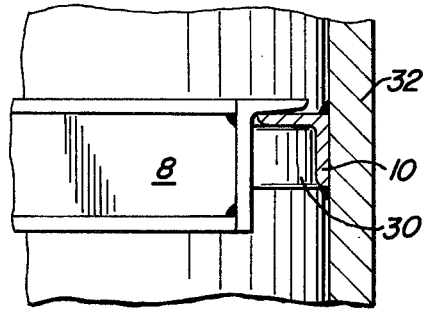
FIG. 6 is a side view of an alternative beam support.

FIG. 6 illustrates that instead of the I-beams 8 resting in U-clips, they may rest on angular ledge 10 welded to the tower wall 32, using weld-on clip 30.

Packing units of any suitable shape and size, and of suitable composition are dumped or stacked in the tower above the support plate. The depth of the bed of the packing elements will vary depending on the operation carried on in the tower.

Figure 8:
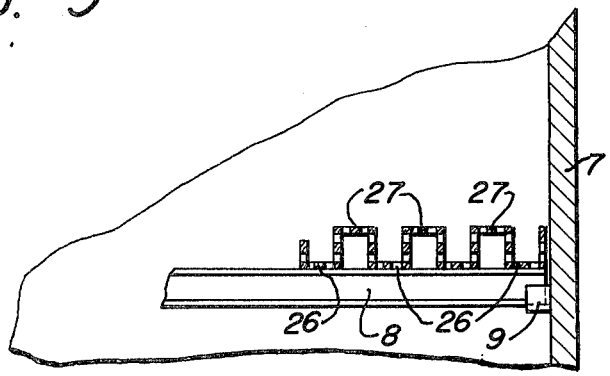
FIG. 8 is a section through a support plate having a different cross section.

FIG. 8 is a cross-section through a support plate produced by braking an intermittently expanded sheet at right angles in unexpanded areas. This produces a support plate with flat surfaces 26 interrupted by rectangular projections (often squares) 27 which give the plate a materially greater area of openings than is possible in a flat sheet.

Figure 9:
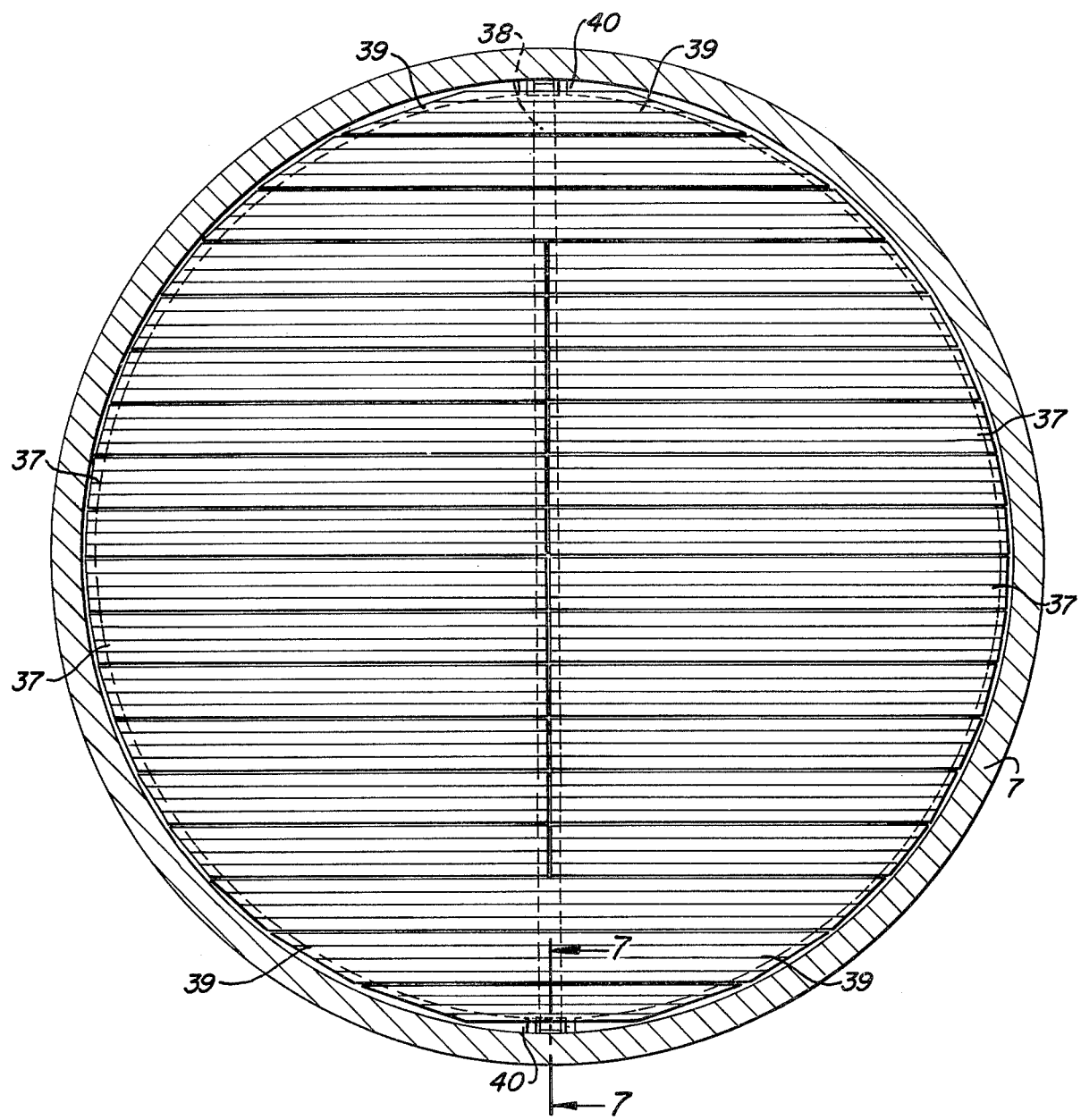
FIG. 9 is a plan view which shows how the ends of the sections can be cut in straight or substantially straight lines.

FIG. 9 is a section through tower 7. The support plate is composed of a number of sections. Those ends of the different sections which are to be placed progressively further from the middle section are cut at progressively larger angles. They are cut without any waste, as explained above, regardless of whether they are sections 37 toward the middle which extend from one side of the tower to the diametric support beam 38, or are sections 39 which are farthest from the middle section and extend from one tower wall to the other. Since there are four aligned sections 37 on each side of the middle sections and also four sections 39, two strips may be cut twice at each angle to produce strips of the same length, if preferred. Note that the distance of the outer edge of the outside sections is spaced a short distance from the tower wall.

I claim:

1. A tower of high gas-and-liquid handling capacity, provided with means for supplying gas and liquid thereto and having therein a support plate having packing elements thereon, for providing contact between the gas and liquid, which support plate is of undulating cross section and formed of units which comprise (a) areas of expanded sheet metal with openings formed of cross members and (b) areas which are not expanded, the size of said openings being suitable for supporting the packing elements, the support plate being broken in opposite directions along parallel lines with the bottoms formed of spaced unexpanded areas broken in the same plane to provide a bottom adapted to rest on a flat surface.

2. The tower of claim 1 in the support plate unit of which the expanded areas are of substantially the same width and the unexpanded areas are of substantially the same width and the distances between the brake lines are the same.

3. The tower of claim 1 the support plate unit of which includes a single brake in an unexpanded area between two spaced expanded areas, the edges of which unit are unexpanded areas.

4. The tower of claim 1 the support plate of which comprises units some of which are higher than others.

5. The tower of claim 1 the support plate of which is in sections, which sections at the middle of the tower are higher than those at the edges.

6. The tower of claim 1 in which support plate is of undulating cross section, and is composed of a plurality of units with the edges of two adjacent units in contact and slanting up toward one another.

* * * * *

UNITED STATES PATENT OFFICE
CERTIFICATE OF CORRECTION

PATENT NO. : 4,028,442
DATED : June 7, 1977
INVENTOR(S) : John S. Eckert

It is certified that error appears in the above-identified patent and that said Letters Patent are hereby corrected as shown below:

Column 1, line 23, "sectionmade" should be -- section made --

Column 2, line 34, "and" should be -- any --

Claim 6, line 1, "the" should be inserted before "support"

Signed and Sealed this sixteenth Day of August 1977

[SEAL]

Attest:

RUTH C. MASON
*Attesting Officer*

C. MARSHALL DANN
*Commissioner of Patents and Trademarks*